United States Patent [19]

Mehrle

[11] Patent Number: 5,794,236

[45] Date of Patent: Aug. 11, 1998

[54] COMPUTER-BASED SYSTEM FOR CLASSIFYING DOCUMENTS INTO A HIERARCHY AND LINKING THE CLASSIFICATIONS TO THE HIERARCHY

[75] Inventor: Joseph P. Mehrle, Hamilton, Ohio

[73] Assignee: Lexis-Nexis, Miamisburg, Ohio

[21] Appl. No.: 654,871

[22] Filed: May 29, 1996

[51] Int. Cl.$^6$ .................................................. G06F 17/30
[52] U.S. Cl. ................................. 707/5; 707/3; 707/514; 707/529; 707/907
[58] Field of Search ..................... 395/605, 778, 395/761, 942, 54, 603; 707/5, 3, 514, 529, 907

[56] References Cited

U.S. PATENT DOCUMENTS

| | | | |
|---|---|---|---|
| 4,376,936 | 3/1983 | Kott | 340/825.3 |
| 4,642,762 | 2/1987 | Fisanick | 364/300 |
| 4,965,763 | 10/1990 | Zamora | 364/900 |
| 5,067,166 | 11/1991 | Ito | 382/215 |
| 5,159,667 | 10/1992 | Borrey et al. | 395/148 |
| 5,201,047 | 4/1993 | Maki et al. | 395/600 |
| 5,247,437 | 9/1993 | Vale et al. | 364/419.19 |
| 5,247,661 | 9/1993 | Hager et al. | 395/600 |
| 5,276,869 | 1/1994 | Forrest et al. | 395/600 |
| 5,309,359 | 5/1994 | Katz et al. | 364/419.19 |
| 5,404,295 | 4/1995 | Katz et al. | 364/419.19 |
| 5,418,948 | 5/1995 | Turtle | 707/4 |
| 5,418,951 | 5/1995 | Damashek | 395/600 |
| 5,463,773 | 10/1995 | Sakakibara et al. | 395/600 |
| 5,594,897 | 1/1997 | Goffman | 707/102 |
| 5,628,008 | 5/1997 | Hayashi | 395/603 |
| 5,642,435 | 6/1997 | Loris | 382/229 |
| 5,642,502 | 6/1997 | Driscoll | 395/605 |
| 5,642,522 | 6/1997 | Zaenen et al. | 707/523 |
| 5,664,109 | 9/1997 | Johnson et al. | 705/2 |

Primary Examiner—Thomas G. Black
Assistant Examiner—Jean R. Homere
Attorney, Agent, or Firm—Reid & Priest LLP

[57] ABSTRACT

A computer system uses a legal hierarchy annotated with seed citations to generate a control file, and then using the control file, permits legal documents to be classified automatically into the legal hierarchy without the need for manual intervention. Each classification within the legal hierarchy receives a unique numerical classification key which identifies the location of the classification within the legal hierarchy. Each level of the hierarchy also receives a unique hierarchy location key which identifies a hierarchical document through which a user can retrieve a legal document which displays to the user a classification. The control file is an automatically-generated intermediate file which identifies the legal classifications, their classification keys, and the hierarchy location keys to which the classifications map. This automatically generated control file is input to a legal classification generator, along with a document to be classified. The unclassified legal document is scanned electronically for citations, which are stripped and normalized, and then compared to the seed citations in the control file for matches. For each match which occurs, each new classification with which the seed citation was associated is stored in memory along with a numerical initial classification score of zero; and each previously-identified classification results in the classification score being incremented. Heuristic rules are employed to increment the classification scores based on the seed citation matched. After all citations have been checked against the seed citations, all classification scores are checked against a threshold value. If the classification score for any particular classification is greater than or equal to the threshold value, then the classification key and the hierarchy location key associated with the classification are inserted into the legal document.

13 Claims, 7 Drawing Sheets

Subsection K — Cash or Deferred Arrangements
CLASSIFICATION _ KEY - 401K
HIERARCHY _ KEY _ 401K

NORMALIZED _ 26 _ U.S.C. _ 401(k)    — CLASSIFICATION _ KEY _ 401K
                                       HIERARCHY _ KEY - 401K

NORMALIZED _ 440 _ F.2d _ 516        — CLASSIFICATION _ KEY _ 401K
                                       HIERARCHY _ KEY - 401K

NORMALIZED _ 73-1 _ USTC _ para _ 9107  — CLASSIFICATION _ KEY _ 401K
                                          HIERARCHY _ KEY - 401K

COMPUTER-BASED SYSTEM FOR CLASSIFYING DOCUMENTS INTO A HIERARCHY AND LINKING THE CLASSIFICATIONS TO THE HIERARCHY

BACKGROUND OF THE INVENTION

1. Field of the Invention

This invention relates generally to computer-based methods and apparatus for processing text and, more specifically, to automated classification systems for legal documents utilizing some heuristic rules.

2. Related Art

Electronic legal research continues to increase at a rapid pace in the legal profession. As a result, there have been an increasing number of legal sources which have been digitized and made available on electronic systems such as LEXIS® (LEXIS is a registered trademark of Reed Elsevier Properties, Inc.) and WESTLAW® (WESTLAW is a registered trademark of West Publishing Co.). Classification of legal documents has largely been a manual exercise, dominated by West Publishing, Co. Since the late 1860's West Publishing, Co. has employed lawyers to manually read case-law opinions as they are released and classify those opinions utilizing a Key Number System. To date, the process of classifying legal case-law opinions remains dominated by West Publishing, Co. and remains a manual process. A tremendous amount of human resources is needed to maintain the West Publishing, Co.'s manual process of classifying legal documents. Additionally, since lawyers desperately need case-law opinions dating back to the beginnings of the law, new competitors are virtually precluded from entering this field because of the level of manual effort required to read historical case-law decisions.

In the field of computerized text processing, there exist numerous applications where electronic documents are classified according to some attribute information extracted from or associated with the electronic document. These applications exist in automated applications as well.

None of these systems attempts to classify and map legal documents into legal hierarchies. Some systems, such as that disclosed in U.S. Pat. No. 4,642,762 to Fisanick, have attempted to utilize controlled vocabulary terms to restrict the problem space associated with classifying electronic documents. Controlled vocabulary terms are pre-defined words which are identified by experts as relating to a particular classification. The vocabulary terms are static and defined in advance, so related terms can be missed resulting in lower recall associated with the classification. Vocabulary is inherently unstable. The number of permutations necessary to control (pre-define) the vocabulary becomes uncontrollable as the volume of documents increases. Accuracy rates of automated classification schemes utilizing controlled vocabulary can be suspect. The present invention avoids this problem by utilizing citations as the key attribute to classification. Citations are inherently stable in the domain of law. Propositions stated in the legal documents must be supported by legal authority, which consists of legal citations.

Some systems, such as that disclosed in U.S. Pat. No. 5,247,437 to Vale et al., have created automatic indexes that are associated with a document and are then capable of linking the index terms created back to a specific location within the document processed. Other systems, such as that disclosed in U.S. Pat. No. 5,201,047 to Maki et al., have dealt with business or electronic classifications, utilizing user inputted attributes or profiles to determine the classification of an electronic document.

Prior art systems in the area of automated legal classification such as that disclosed by C. Tapper, "An Experiment in the Use of Citation Vectors in the Area of Legal Data" (1982), have been based on clustering related legal documents together on the basis of similarly occurring citations. However, a document is used as a search source in these prior art systems, and to retrieve other documents related to the document being used as a search source, citations contained in the initial document must exist in the documents returned. A document is not assigned a classification to a legal hierarchy, but rather any document can be used as a search source to dynamically return documents similar to the one being used as the search source. For example, consider two different landmark decisions D1 and D2 that are cited in case-law documents A1 and A2. Assume that the landmark decisions are associated with an area of law identified as Constitutional-Due-Process-Privacy-Abortion. Case A1 cites D1 but not D2, while case A2 cites D2 but not D1. Under the previous research conducted in this area, if A1 is used as an electronic search source, A2 will not be captured as relevant to A1 since they have no citations in common. This result is unsatisfactory because A1 and A2 are related; they are related by a pre-defined legal classification of Constitutional-Due-Process-Privacy-Abortion even though A1 and A2 cite different landmark decisions. None of the prior art systems has attempted to classify legal documents to a legal hierarchy. It is to the solution of these and other problems to which the present invention is directed.

SUMMARY OF THE INVENTION

It is therefore a primary object of the invention to provide a computer-based system that will classify a legal document into a location within a legal hierarchy.

It is another object of the present invention to provide an automated means of classifying legal documents eliminating the need for manual classification.

It is another object of the present invention to provide an improved legal document classification system which permits classifications to be linked to legal hierarchies.

The foregoing objects are achieved as is now described. The system in accordance with the present invention uses an electronic version of a legal hierarchy annotated with citations to generate a control or seed citation file, and then using the control or seed citation file, permits legal documents to be classified automatically into the legal hierarchy without the need for manual intervention. The citations associated with the legal hierarchy can be any type of legal citation, e.g., landmark legal case-law decisions, administrative law decisions, statutory citations, or rule citations. These citations associated with a legal hierarchy will be referred to as "seed citations" hereinafter.

Each classification within the legal hierarchy receives a unique classification key. The classification key will consist of a set of numbers concatenated together into one larger number string. Reading the number string from left to right will identify the location of the classification within the legal hierarchy. If a classification appears at a non-terminal node in the hierarchy (i.e. more lower levels of the hierarchy exist beyond the classification selected) then the number string will be padded with 0's to the right. For example, a unique classification key associated with a classification belonging to a hierarchy containing a maximum of five levels might appear as follows: "0102000000" where "01" identifies the first level of the hierarchy, e.g. Federal Constitutional Law; "02" identifies the second level of the hierarchy, e.g. Due Process; and the six right-hand "0"s identify the remaining three levels of the hierarchy which are irrelevant because the classification occurs only at the second level of the hierarchy.

A scheme of unique classification keys like this mapped to each classification in the hierarchy will allow for cumulative retrieval of all classifications occurring below any non-terminal node of the hierarchy. The unique classification key is necessary for performance of the computer-based system described herein. This is because when an end-user is electronically browsing the legal hierarchy utilizing a computer display monitor, keyboard, and/or computer mouse, and the user accesses the classification within the hierarchy, the only electronic search which will occur will be on a unique classification key which is contained in the legal documents rather than a search occurring on all the necessary seed citations associated with that classification.

In addition to each classification receiving a classification key, each level of the electronic version of the hierarchy receives a location key. This hierarchy location key provides an electronic address to a specific hierarchical document corresponding to one level of the hierarchy. This hierarchy location key is simply a sequential number (unique within the hierarchy) which identifies a hierarchical document. A user utilizing a computer display monitor, keyboard, computer mouse, and/or other navigational devices (e.g., track ball, glide point) can retrieve a legal document which displays a classification to the user. The user by using the keyboard, computer mouse, etc. can select the classification. Once the classification has been selected an electronic search will occur on the hierarchy location key. This will retrieve a document associated with the user-selected classification which will be at a specific location (specific level) of the legal hierarchy.

In accordance with the invention, the electronic version of the hierarchy is provided to a computer. A software program utilizing the computer processor and memory will produce two files from the hierarchy: a control or seed citation file, and an electronic legal hierarchical file. The control or seed citation file identifies the legal classifications, their classification keys, and the hierarchy location keys to which the classifications map. This automatically generated control file is input to the legal classification generator for use in classifying an unclassified legal document.

The electronic legal hierarchical file will be an electronic file which is in a format compatible with the Lexis®-Nexis® on-line service. The electronic legal hierarchical file consists of multiple documents, each document corresponding to a level of the legal hierarchy, with all classifications for a given level being placed in the document for that level. The electronic legal hierarchical file will contain classification names which will display to an end-user who has a computer display monitor and a computer which is connected to the Lexis®-Nexis® service. The classification keys and the hierarchy location keys will exist in the electronic legal hierarchical file but will not be displayed to the end-user, for use in conducting an electronic search for a selected classification.

The generator utilizes a computer system comprising a memory and a processor. A program will be used to scan electronically an incoming legal document for citations. Citations are stripped (isolated and stored utilizing the memory) and normalized. Normalization means that all permutations of the same citation will be stored electronically in memory using one standard format.

Next, the stripped and normalized citations are compared to the seed citations in the control file for matches, utilizing a matching software program. For each match which occurs, each new classification with which the seed citation was associated is stored in memory along with a numerical initial classification score of zero; and each previously-identified classification results in the classification score being incremented. If a document being processed is itself a seed citation, then each classification score for that seed citation is set to equal a threshold value desired plus 1. If a seed citation match occurs on a citation which is a statutory citation, then the classification score is incremented by 2. If the document being processed is a case-law document, then citation matching only occurs in the opinion segment of the case-law decision, i.e. no citation matching will occur in a dissenting or concurring opinion segment. After all citations have been checked against the seed citations, all classification scores are checked against a threshold value. If the classification score for any particular classification is greater than or equal to the threshold value, then the classification key and the hierarchy location key associated with the classification are inserted into the legal document utilizing a write software program. This particular write software program will write the classification key and the hierarchy location key into the legal document.

BRIEF DESCRIPTION OF THE DRAWINGS

The invention is better understood by reading the following Detailed Description of the Preferred Embodiments with reference to the accompanying drawing figures, in which like reference numerals refer to like elements throughout, and in which.

DETAILED DESCRIPTION OF THE PREFERRED EMBODIMENTS

In describing preferred embodiment of the present invention illustrated in the drawings, specific terminology is employed for the sake of clarity. However, the invention is not intended to be limited to the specific terminology and the specific example so selected. It is to be understood that each specific element includes all technical equivalents which operate in a similar manner to accomplish a similar purpose.

The general principles associated with automatically classifying legal documents to legal hierarchies are as follows: 1) The law is organized into hierarchies, or outlines; 2)

lawyers are trained to follow these hierarchies; 3) a proposition enunciated in a legal document is supported by the legal authority from which it is derived, this authority taking the form of a legal citation; and 4) secondary source materials, e.g. law reviews, annotations, etc., have already exhaustively annotated the law into hierarchical outlines, these hierarchies being annotated with landmark citations.

Figure 6:
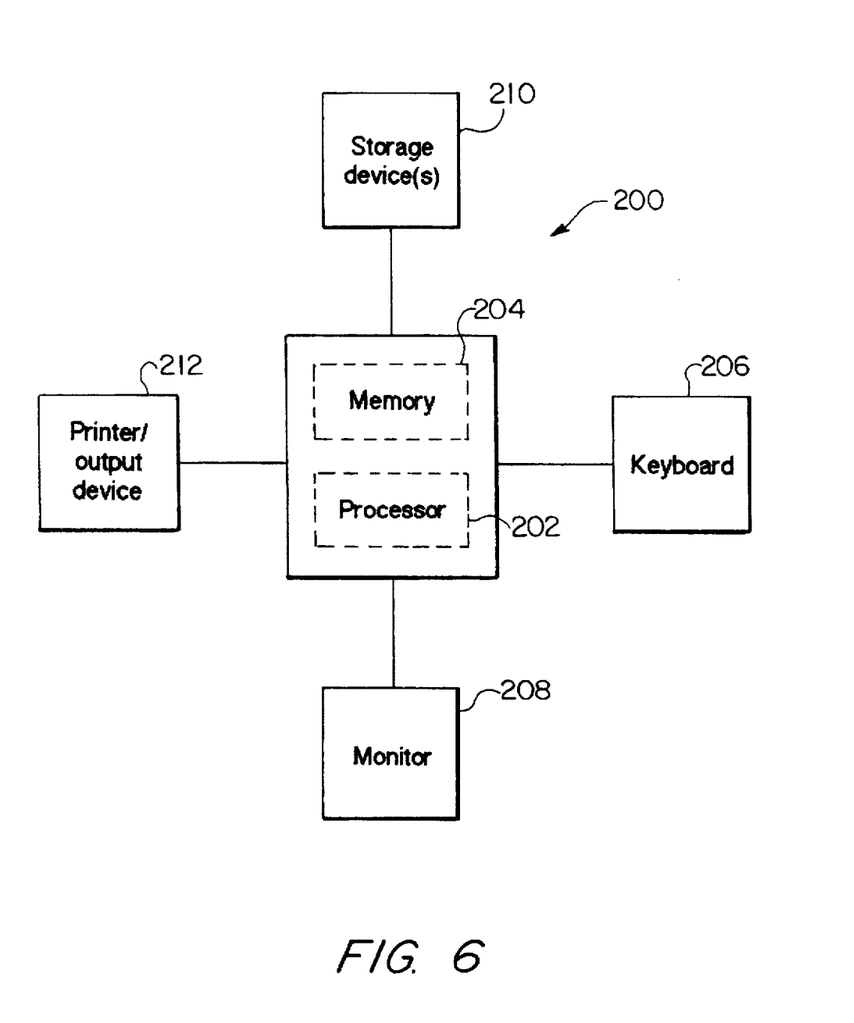
FIG. 6 is a diagrammatic representation of the hardware used to carry out the processes in accordance with the invention.

The system in accordance with the present invention utilizes the above guiding principles to automatically classify legal documents into legal hierarchies without the need for manual intervention. The system in accordance with the invention utilizes two processes, one of which operates on the legal hierarchy to produce an electronic file referred to herein as a control file and an electronically-compatible version of the legal hierarchy; and the other of which operates on an unclassified legal document using the control file to produce the legal classification generator. The process is carried out utilizing a computer 200 including a processor 202 and a memory 204, and external input/output means for inputting and outputting information (e.g., computer keyboard 206, and computer display monitor 208), one or more storage devices 210 (such as an attached storage disk device), and a printer/output device 212, as shown in FIG. 6.

The external input/output devices, operating system, and the computer can be of the type described in U.S. Pat. No. 5,276,869 to Forrest et al., which is incorporated herein by reference in its entirety. The preferred platform for producing the control file is a distributed computing environment running on Sparc workstations in the Solaris operating system and employing programs written in the computer languages of C++ and Flex. The preferred platform for processing unclassified legal documents into classified legal documents is a mainframe computing environment running on IBM 3270s in the MVS operating system and employing programs written in the computer language of PLI.

Figure 1:
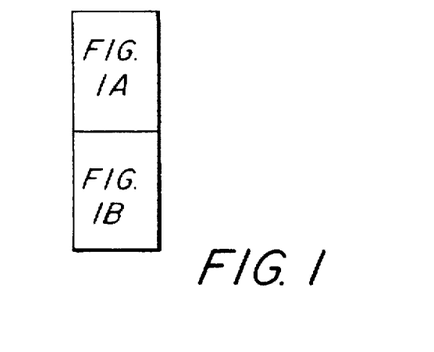
FIG. 1 shows the arrangement of FIGS. 1A and 1B.
Figure 1A:
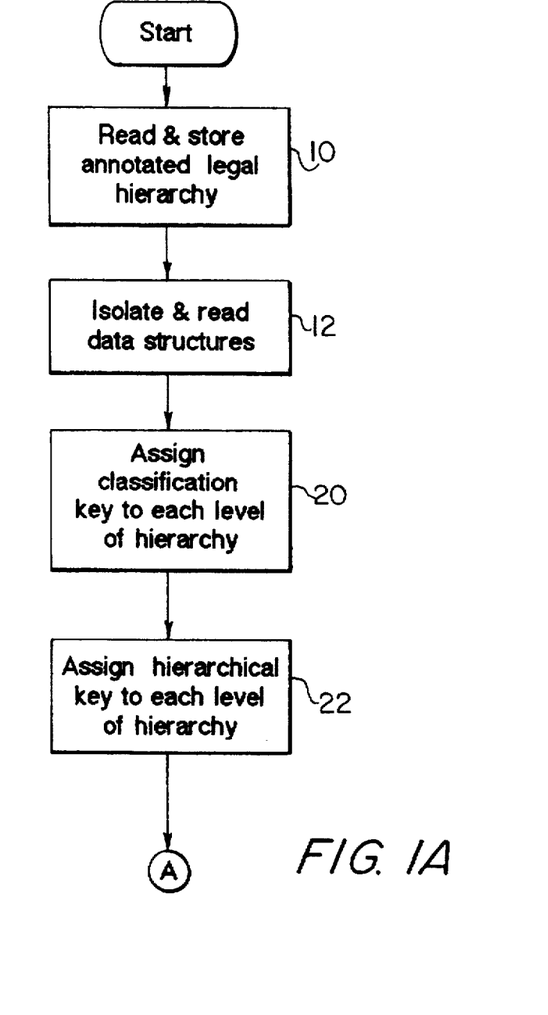
FIGS. 1A and 1B together are a high level flow diagram of the method employed by the system in accordance with the present invention.
Figure 1B:
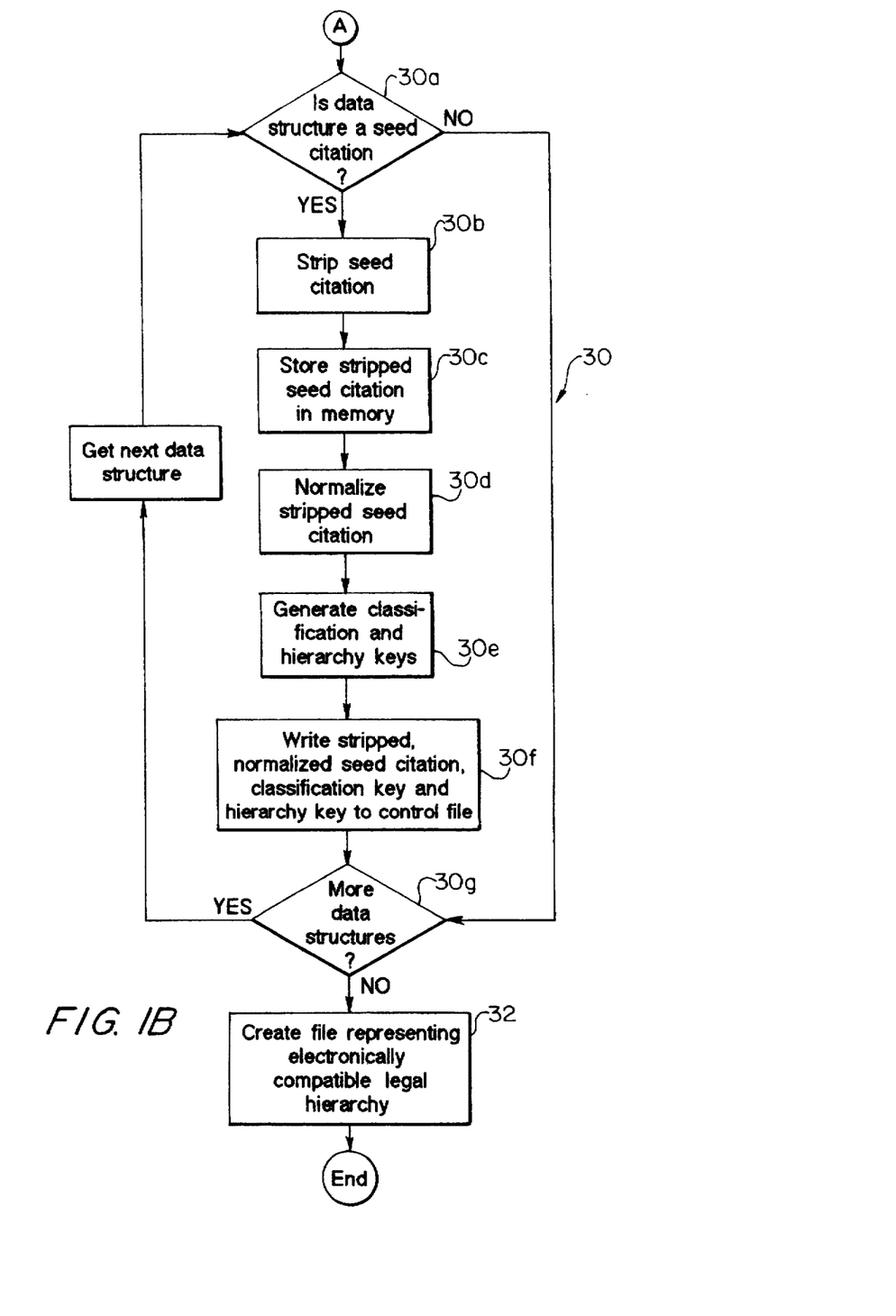
Figure 2:
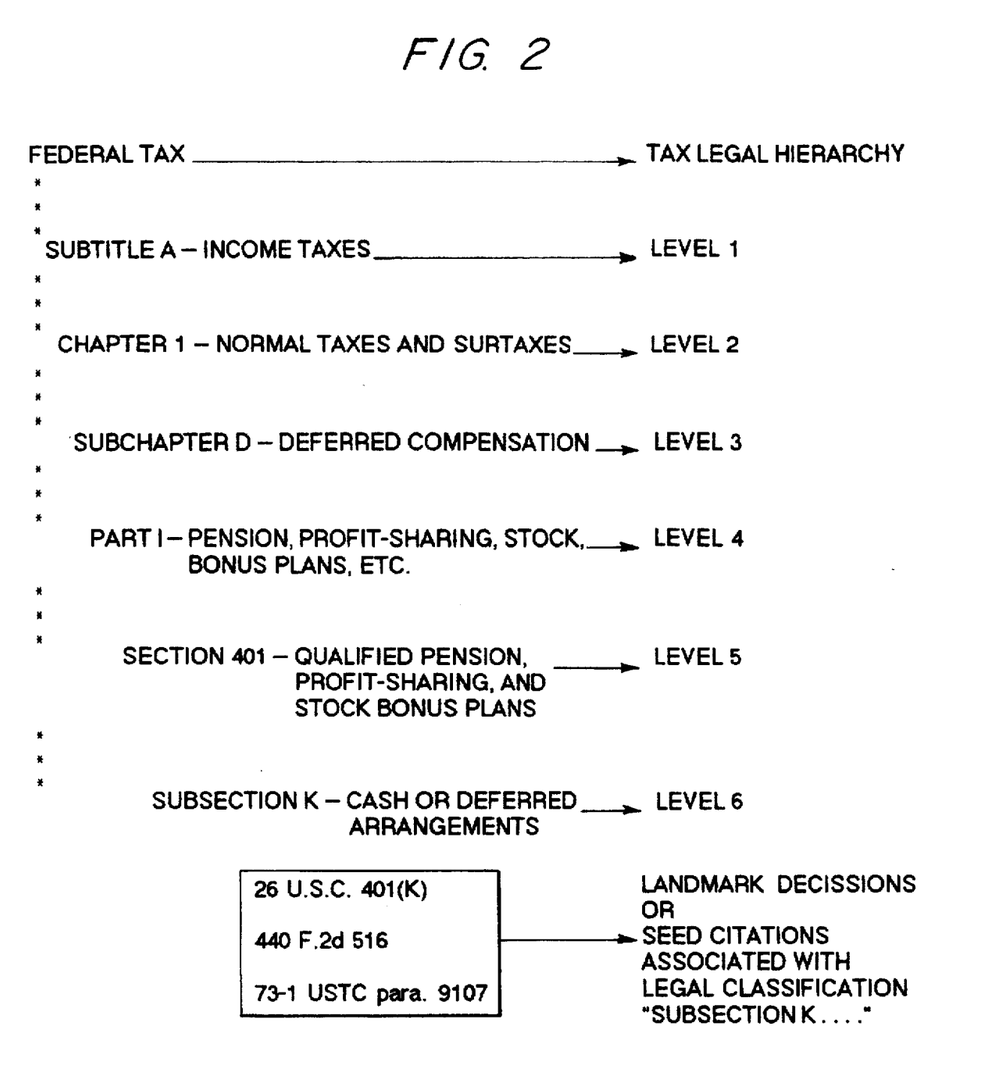
FIG. 2 is a portion of a sample legal hierarchy inputted in accordance with the present invention annotated with legal citations and seed citations.

The first process, shown in FIGS. 1A and 1B, operates on the legal hierarchy annotated with seed citations, as previously defined. This legal hierarchy may be a commercially available hierarchy such as those appearing in annotated statutes, law reports, law reviews, or legal encyclopedias. The hierarchy may also be manually created. Manual creation would entail an expert in a particular area of the law inputting a hierarchy annotated with seed citations into an electronic file utilizing a computer keyboard. FIG. 2 depicts a portion of one such hierarchy for a legal topic associated with federal taxation.

In the hierarchy as illustrated in FIG. 2 there are six levels, although it will be appreciated by those in the art that the number of levels and their contents will vary according to the particular subject matter. At the first level of the illustrated hierarchy are all subtitles of the federal tax code; at the second level are all chapters of the federal tax code; at the third level are all subchapters; at the fourth level are all parts; at the fifth level are all sections, and at the sixth level are all subsections. Seed citations can exist at all levels of the hierarchy. Regardless of the number of levels, at the lowest level of the hierarchy (referred to herein as the "leaf node"), one or more seed citations must exist. These citations can be statutory citations, landmark case-law decisions, or administrative decisions.

In a first step 10, the legal hierarchy annotated with citations is read by a software program resident in the memory 204 of the computer 202, and is then stored as hierarchical data in the memory 204 of the computer 202. In a second step 12, another software program resident in the computer memory 204 will access the computer's attached storage disk device 210 and locate the hierarchical data. This second program will isolate data structures of the hierarchy, such as the level of the hierarchy and any concomitant seed citations. Those of ordinary skill in the art will readily be able to write software programs of the type needed to carry out the first and second steps 10 and 12. Once these data structures have been isolated and read, the first process proceeds to the third step 20.

In the third step 20, each classification of the hierarchy will receive a classification key. Each classification is unique, and consists of a set of numbers concatenated together into one larger number string. Reading the number string from left to right will identify the location of the classification within the legal hierarchy. If a classification appears at a non-terminal node in the hierarchy (i.e. more lower levels of the hierarchy exist beyond the classification selected), then the number string will be padded with 0's to the right. For example, a unique classification key associated with a classification belonging to a hierarchy containing a maximum of five levels might appear as follows: "0102000000" where "01" identifies the first level of the hierarchy, e.g. Federal Constitutional Law; "02" identifies the second level of the hierarchy, e.g. Due Process; and the six right-hand 0's identify the remaining three levels of the hierarchy which are irrelevant because the classification occurs only at the second level of the hierarchy.

A scheme of unique classification keys like this mapped to each classification in the hierarchy will allow for cumulative retrieval of all classifications occurring below any non-terminal node of the hierarchy. The unique classification key is necessary for performance of the computer-based system described herein. This is because all of the legal documents available to an end-user through an electronically-searchable data base contain one or more unique classification keys. When the end-user is electronically browsing the legal hierarchy utilizing a computer display monitor, keyboard, and/or computer mouse, and the user accesses the classification within the hierarchy, the electronic search which will be based on the accessed unique classification key rather than on all the necessary seed citations associated with that classification.

In a fourth step 22, each level of the hierarchy will receive a hierarchy location key. This hierarchy location key provides an electronic address to a specific hierarchical document corresponding to one level of the hierarchy. This hierarchy location key is simply a sequential number (unique within the hierarchy) which identifies a hierarchical document, to be described in detail below. In the hierarchy depicted in FIG. 2, each subtitle would receive its own classification key, but all subtitles would be assigned the same hierarchy location key.

With reference to the example shown in FIG. 2, a hierarchy is input in an electronic format either manually by a user from the computer keyboard 206 (the hierarchy also being displayed to the user on the computer monitor, 208) or automatically from an already existing electronic representation of the hierarchy attached to and accessible by the computer 200. A software program resident in the computer memory 204 will read the annotated hierarchy input in step 10. Each level of the hierarchy will receive a hierarchy location key in step 22, and the hierarchy will then be converted into data structures for each level of the hierarchy.

A user utilizing the computer display monitor 208, keyboard 206, and computer mouse and/or other navigational devices (e.g., track ball, glide point) can retrieve a legal document which displays a classification to the user. The user by using the keyboard 206, computer mouse, etc. can select the classification. Once the classification has been selected, an electronic search will occur on the hierarchy location key. This search will retrieve a document associated with the user-selected classification which will be at a specific location (specific level) of the legal hierarchy.

The fifth step is actually a loop 30 which comprises a series of sub-steps 30a through 30f. In loop 30, seed citations when detected (sub-step 30a) will be stripped (sub-step 30b) and stored in memory (sub-step 30c), normalized (sub-step 30d), and written by an output means to an electronic control file, which will contain classification keys associated with the seed citation along with a hierarchy location key that identifies the location within the hierarchy from which the classification came (sub-steps 30e and 30f). Because the citations are normalized, all permutations of the same citation will be stored electronically using one standard format. For example, with respect to the citation 26 U.S.C. 401(k) shown in FIG. 2, all of the following permutations will be stored in one format and not in three formats: 26 U.S.C.S. 401; 26 U.S.C.A. 401; and 26 U.S.C. 401.

The output means preferably will be the disk storage device 210 connected to the computer 200, and a program resident in the computer memory 204 will access the external disk storage device 210 and store on that device the information constituting the control file.

Figure 4:
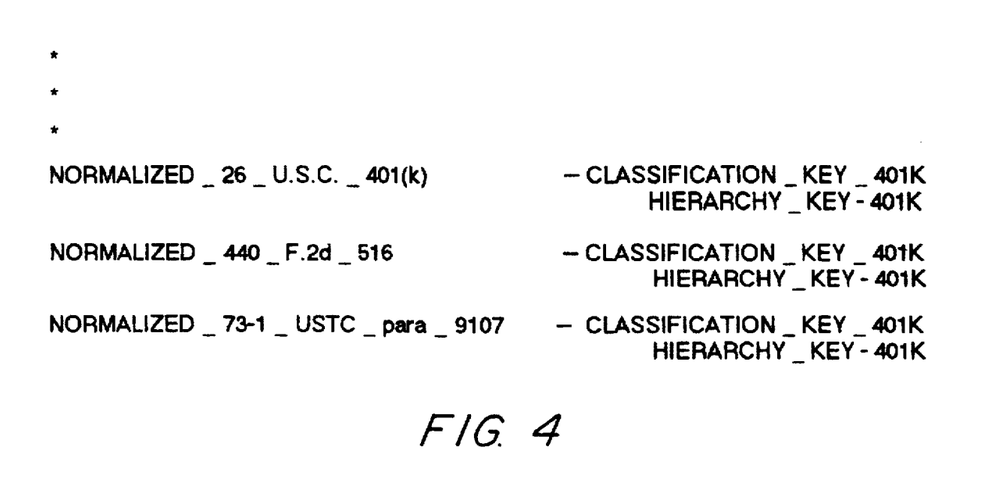
FIG. 4 is a portion of a control file generated in accordance with the present invention and containing normalized seed citations and their corresponding classification and hierarchy location keys.

When converting the data structure for each level of the hierarchy, a software program resident in the computer memory 204 will detect the presence of a seed citation in step 30a. In the example provided in FIG. 2, Level 6 of the hierarchy has an associated data structure consisting of three seed citations; the first encountered seed citation is "26 U.S.C. 401(k)." The seed citation is stripped in sub-step 30b, stored in memory in sub-step 30c, and normalized in sub-step 30d. In sub-step 30e, a key is generated for the seed citation's classification and its level of the hierarchy. This information is then written to an electronic control file in sub-step 30f, the electronic file being attached to the computer apparatus 200 shown in FIG. 6. The control file comprises a normalized version of the seed citation along with the unique classification key and the hierarchy location key, as shown in FIG. 4.

Figure 3:
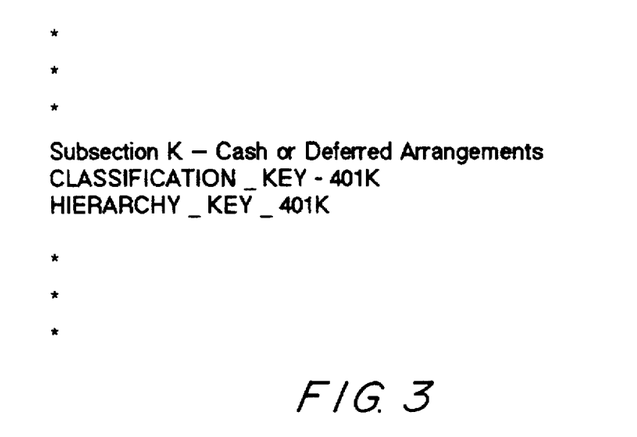
FIG. 3 is a portion of a legal hierarchy generated in accordance with the present invention and containing unique classification keys and hierarchy location keys.

Following sub-step 30f, if there are more data structures (sub-step 30g), processing will loop back to sub-step 30a in FIG. 1A to determine if more seed citations exist. If all data structures are converted (sub-step 30g) and no more seed citations are encountered, processing ceases and in step 32, a file as shown in FIG. 3 will be created which represents an electronically compatible legal hierarchy, referred to herein as a "legal hierarchical file."

The electronic legal hierarchical file will be an electronic file which is in a format compatible with the Lexis®-Nexis® on-line service. The electronic file consists of multiple documents, each document corresponding to a level of the legal hierarchy, with all classifications for a given level being placed in the document for that level. The electronic file will contain classification names which will display to an end-user who has a computer display monitor and a computer which is connected to the Lexis®-Nexis® service. The classification keys and the hierarchy location keys will exist in the file but will not be displayed to the end-user. These keys will be used as described above.

Each specific electronic document in the legal hierarchical file is provided with a hierarchy location key. As will be discussed in greater detail hereinafter, when a document is classified, it is assigned at least one hierarchy location key which corresponds to one of the electronic documents' hierarchy location key. By using the hierarchy location key in the classified legal document, the user can jump from the classified legal document to the specific electronic document of the legal hierarchical file which has that hierarchy location key. The legal hierarchical file thus provides mapping access to later classified legal documents and an electronic means by which a user can link directly into the hierarchy from a legal document.

Figures 5, 5A:
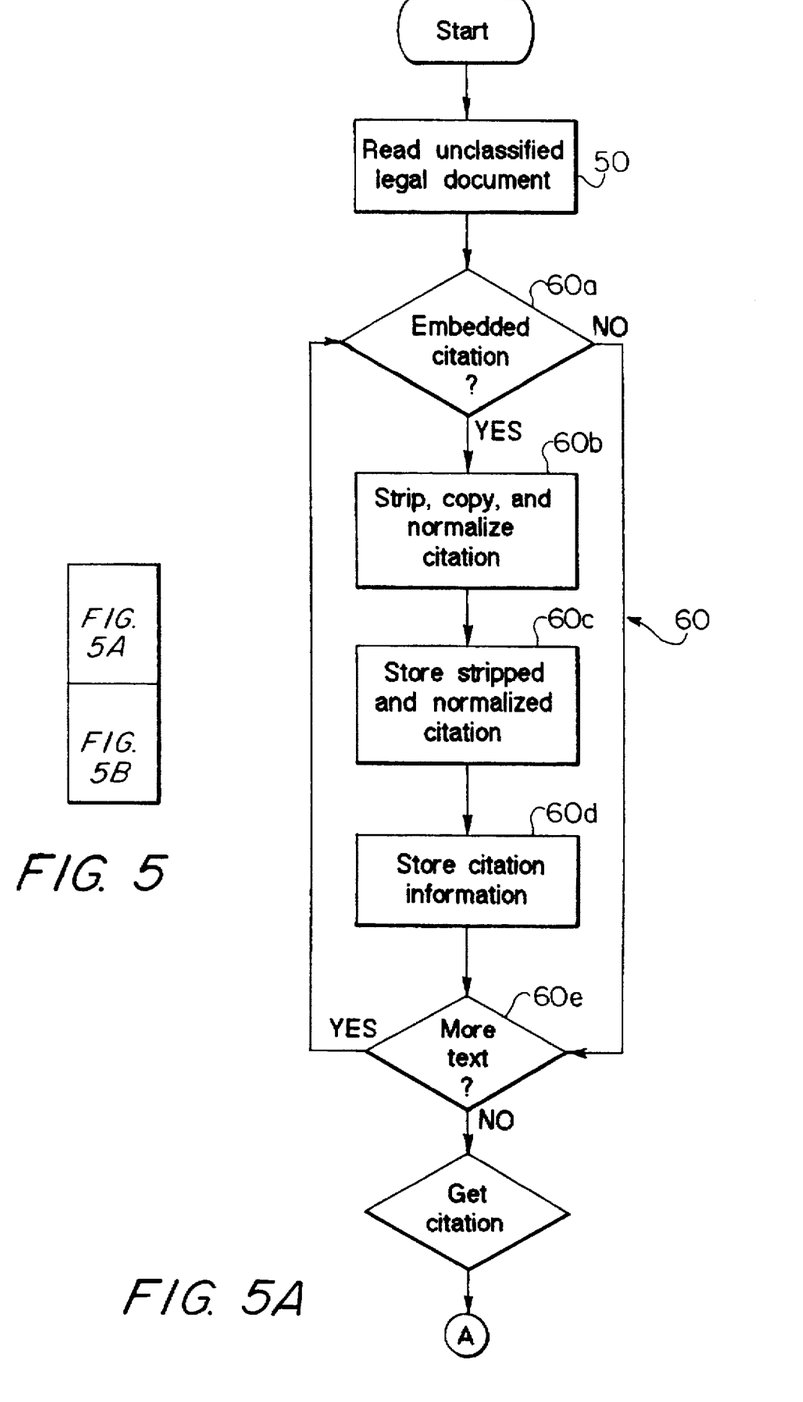
FIG. 5 shows the arrangement of FIGS. 5A and 5B.
FIGS. 5A and 5B together are a flow diagram of the legal document classification generator in accordance with the present invention, which classifies legal documents and maps them to a legal hierarchy.
Figure 5B:
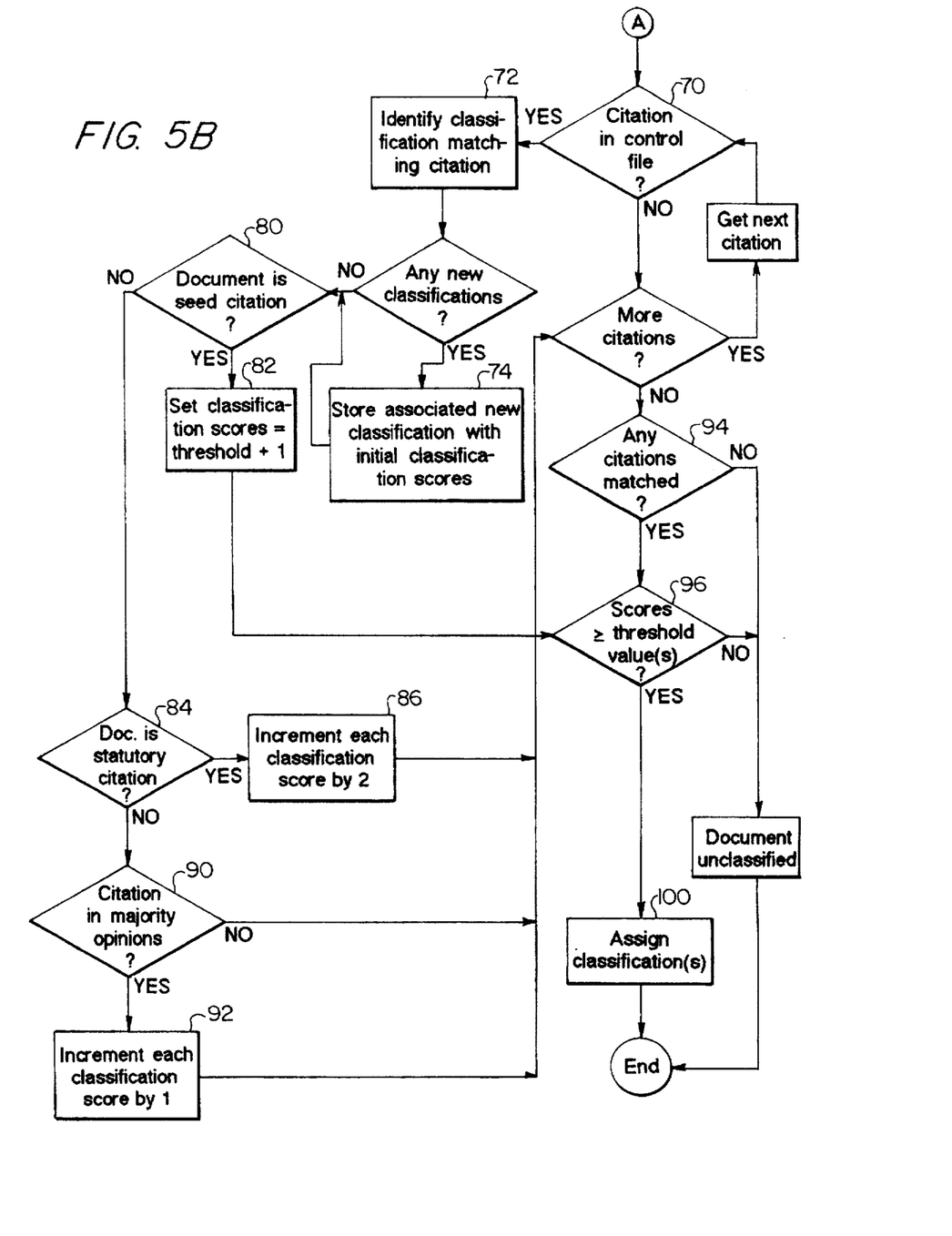

The second process in accordance with the present invention is the legal classification generator shown in FIGS. 5a and 5b. FIG. 5a takes as input an unclassified legal document read from an electronic file in step 50. This unclassified legal document may be input to the computer 200 manually from a user utilizing computer keyboard 206 and monitor 208, or it may already be in electronic format and its location on an external disk storage device 210 passed to the generator described above and shown in FIGS. 5A and 5B. In loop 60 of FIG. 5A, the legal classification generator processes the unclassified legal document for embedded citations contained in the unclassified legal document.

Processing of the unclassified document for citations is done using a scanning program residing in the computer memory 204. While the electronic representation of the unclassified legal document passes through the program, the scanner program looks for patterns contained in the electronic text which are indicative of citations. Such patterns comprise things such as digits followed by a reporter abbreviation followed by digits and concluded with a parenthetical. The scanner program will recognize, strip and normalize citations encountered in the electronic text. For example, the scanner program will recognize as a citation this pattern contained in the text of a legal document: 100 U.S. 1 (1901).

In sub-step 60a, the scanning program detects patterns in the electronic text conforming to volume number followed by reporter followed by page number and concluded with a parenthetical. In sub-step 60b, the scanning program will strip the recognized citation, make a copy of it, and then normalize it, and in sub-step 60c, the scanning program will store the stripped and normalized recognized citation in memory. Internal to the generator, in sub-step 60d, information is stored about the citation, such as what type of citation was stripped (e.g. case law, statutory, administrative, etc.), in what location within the legal document the stripped citation was found (e.g. for case law majority section, dissenting section, or concurring section), and the date of the citation. A strength identifier, which indicates the importance of the source or author associated with the citation, can also be included in the information stored about the citation. Processing continues until, in sub-step 60e, there is no more text to be examined.

Referring now to FIG. 5B, each detected embedded stripped citation in the unclassified legal document which was stored in memory in sub-step 60a is compared to the control file which was produced in FIG. 1A step 32. The comparison between embedded stripped citations contained in the unclassified legal document and the control file occurs in step 70. If it is determined in step 94 that no stripped citations match any seed citations, then the document remains unclassified.

However, if a match occurs, the classifications corresponding to the citation are identified in step 72 and any new (i.e., previously unidentified) classifications are stored with a corresponding numerical initial classification score of zero in step 74. Simple heuristic rules based upon the knowledge and experience of legal analysts are employed in steps 80–92 to increment the classification scores based on the seed citation matched. For example, if in step 80 it is determined that the unclassified legal document is itself a seed citation, then in step 82, each classification score for that seed citation is set to a value at least as great as a desired threshold value (for example, it can be set equal the threshold value desired plus 1), and the processing of the classification associated with the seed citation does not need to proceed any further in accordance with the heuristic rules, but proceeds directly to step 94. In step 94, each classification score for the seed citation is compared to the threshold value. Because each classification score has previously been set in step 82 to, for example, the threshold value plus 1, each classification associated with the matched seed citation is assigned to the legal document in step 100.

If in step 80 it was determined that the document itself is not a seed citation, then the seed citation match must be to either a statutory citation or a case-law document. This determination is made in step 84, again based on the citation information stored in sub-step 60d (shown in FIG. 5A). If the seed citation match occurs on a citation which is a statutory citation, then in step 86, the classification score is incremented by 2.

If, in step 84, it was determined that the document is a case-law document, then processing continues to step 90. Seed citation matches in case-law documents are only relevant for seed citations occurring in the majority segment of the decision; i.e. no citation matching will occur in a dissenting or concurring opinion segment. Thus, in step 90, the determination is made whether the seed citation occurs in the majority opinion, based on the citation information stored in sub-step 60d (shown in FIGS. 5A). If the seed citation does not occur in the majority opinion, then the next citation, if any, is processed, beginning again at step 70. If the seed citation match occurs on a citation which is a case-law document, in the majority opinion, then in step 92, the classification score is incremented by 1.

After all citations have been checked against the seed citations, it is determined in step 94 if there have been any seed citation matches. If there are none, then the document remains unclassified. However, if there have been any seed citation matches, then processing proceeds to step 96, and all classification scores are checked against the threshold value, which is set as more fully described below. If the classification score for any particular classification is greater than or equal to the threshold value, then in step 100, the classification key associated with the classification and the hierarchy location key associated with the corresponding legal hierarchical file document is inserted into the legal document utilizing a write software program, resulting in assignment of the corresponding classification to the legal document.

When all stripped citations contained in the unclassified legal document have been processed in accordance with steps 70–92, the document will have a list of classification scores for classifications which were found in the document on the basis of matching seed citations. For example, document D could have citations c1, c2, and c3 embedded in it. Citation c1 could be associated with classifications A1, A2, and A3. Citation c2 could be associated with classification A1. Citation c3 could be associated with classifications A1 and A3. Additionally, citation c1 is cited twice in document D. Document D would have a high classification score for classification A1, followed by a slightly lower classification score for classification A3 and the lowest classification score for classification A2. Document D will be assigned only those classifications for which the corresponding classification scores are greater than or equal to a predetermined threshold value.

The threshold value is set based on the desired accuracy level of the system in accordance with the present invention. An accuracy level can be predetermined by the builder of the system described herein and a threshold value for each classification can be entered based on the desired accuracy level. The threshold value can be entered by a legal analyst using a computer keyboard 206 as input to the legal document classification generator described immediately above with reference to FIGS. 5A and 5B, and can be stored internal to the generator in memory 204. If it is determined in step 96 that a classification score is equal to or exceeds the threshold value, the document will receive the classification associated with the classification score in step 100.

As will be appreciated by those of skill in the art, in step 96, it is possible to require that the classification scores be greater than the threshold value. In that case, in step 82, it would be necessary to set each classification score for a document which itself is a seed citation to a value which is greater than the threshold value.

A single legal document may receive multiple classifications. In step 100, any unclassified legal document exceeding the minimum threshold value of step 108 will have inserted into its text the appropriate classification key and hierarchy location key, resulting in a classified legal document. These keys will provide navigation from the document to the hierarchy with which it is associated, and conversely a user traversing the hierarchy described above with reference to FIG. 3 and produced by the process described above with reference to FIGS. 1A and 1B can retrieve legal documents associated therewith.

Modifications and variations of the above-described embodiment of the present invention are possible, as will be appreciated by those skilled in the art in light of the above teachings. For, example although the above disclosed invention describes the application of the system to legal material, it will be apparent to those skilled in the art that the system in accordance with the present invention can be applied to other publications which are equally dependent on citation patterns, e.g. technical and scientific papers.

Also, one need not link to a hierarchy to derive benefits from the invention described herein. For example, a retrieval system could utilize the hierarchical classifications to improve the precision of answer sets, or to rank the results of an answer set. Additionally, the classifications generated by the invention described herein could be used to improve a system that automatically generates abstracts or extracts of a document. Finally, whole documents need not be classified, as the invention described herein can be applied to selected portions of text as well as organized portions of text identified as documents. It is therefore to be understood that, within the scope of the appended claims and their equivalents, the invention may be practiced otherwise than as specifically described herein.

What is claimed is:

1. A computer system for classifying electronic text according to multiple classifications arranged in a hierarchy, comprising:

a memory for storing and retrieving electronic text;

identification means for identifying embedded citations contained in the electronic text;

means for stripping embedded citations identified by said identification means and storing them in memory;

matching means for comparing stripped citations to stored citations associated with at least one classification in the hierarchy, and for identifying stripped citations which match at least one stored citation;

scoring means for assigning scores to the matching citations identified by said matching means, based on heuristic rules;

calculating means for calculating a classification score for each classification associated with the stored citations which match the matching citations identified by said matching means, based on the scores assigned to the matching citations and the heuristic rules;

comparison means for comparing each classification score with a threshold value;

classification means for classifying the electronic text within the hierarchy based on the comparison of the classification score with the threshold value; and association means for associating the electronic text with stored classification identifying strings to produce a classified electronic text.

2. The system of claim 1, further comprising normalizing means for converting the embedded citations into a normalized format.

3. The system of claim 1, wherein said heuristic rules on which said scoring means assigns scores to the matching citations and said calculating means calculates a classification score for each classification include:

a. assigning to electronic text having as its citation a citation corresponding to a stored citation, a classification score having a value at least as great as the desired threshold value;

b. otherwise assigning to a matching citation a score based on what type of document is represented by the matching citation and where in the electronic text the matching citation is located, and incrementing the classification score by the score of the matching citation.

4. The system of claim 1, wherein the threshold value is set based on the desired accuracy level of said system.

5. The system of claim 1, further comprising:

means for associating a date identifier with each matching citation identified by said matching means, the date identifier indicating the date of the matching citation; and means for associating a strength identifier with each matching citation identified by said matching means, the strength identifier indicating the importance of a source or author associated with the citation.

6. The system of claim 1, further including means for changing the threshold value.

7. A method for classifying electronic text according to multiple classifications arranged in a hierarchy using a computer having a memory and a processor, comprising the steps of:

(a) inputting into the memory an electronic text to be classified within the hierarchy;

(b) identifying embedded citations contained in the electronic;

(c) stripping embedded citations identified by the identification means and storing them in the memory;

(d) comparing stripped citations to stored citations associated with at least one classification in the hierarchy, and identifying stripped citations which match at least one stored citation, using the computer processor;

(e) assigning scores to the matching citations based on heuristic rules, using the computer processor;

(f) calculating a classification score for each classification associated with the stored citations which match the stripped citations using the scores assigned to the matching citations, using the computer processor;

(g) comparing each classification score with a threshold value, using the computer processor;

(h) classifying the electronic text within the hierarchy based on the comparison of the classification score with the threshold value, using the computer processor; and (i) associating the electronic text with stored classification identifying strings to produce a classified electronic text, using the computer processor.

8. The method of claim 7, wherein in said step (e), the heuristic rules include the location of each matching citation identified in said step (d) within the electronic text and the type of each matching citation identified in said step (d).

9. The method of claim 7, further comprising the step of:

(j) maintaining a single counter value in the computer processor associated with each classification associated with the stored citations which match the stripped citations; and wherein said step (f) comprises incrementing the counter value by the scores assigned in said step (e).

10. The method of claim 7, further comprising the step of:

(j) setting a threshold value prior to said step (g) of comparing each classification score with the threshold value.

11. A computer system for linking a hierarchical electronic text representing an electronically compatible hierarchy having multiple levels and classifications associated with the levels, with individual electronic text documents containing the classifications within the hierarchy, comprising:

a memory;

storing means for storing a hierarchy in memory, the hierarchy having levels classifications associated with the levels, and citations associated with the classifications;

means for stripping the citations;

generating means for generating a unique classification key associated with each classification within the hierarchy of each citation;

generating means for generating a unique location key associated with the location within the hierarchy from which each classification came;

means for writing the stripped citations, the classification keys, and the location keys to a control file;

means for generating a hierarchical electronic text with the classification and hierarchy location keys from the computer file;

first searching means for searching on the unique classification key associated with a classification; and second searching means for searching on the unique location key associated with each level of the hierarchy.

12. The system of claim 11, wherein each unique classification key comprises a set of numbers concatenated together into one larger number string, the number of sets of numbers corresponding to the number of levels of the hierarchy, and each set of numbers identifying a level of the hierarchy.

13. The system of claim 11, wherein the location key comprises a sequential number, unique within the hierarchy, which identifies a specific hierarchical document corresponding to one level of the hierarchy.

* * * * *